(No Model.)
H. TRENTA.
TURBINE.
No. 572,667. Patented Dec. 8, 1896.
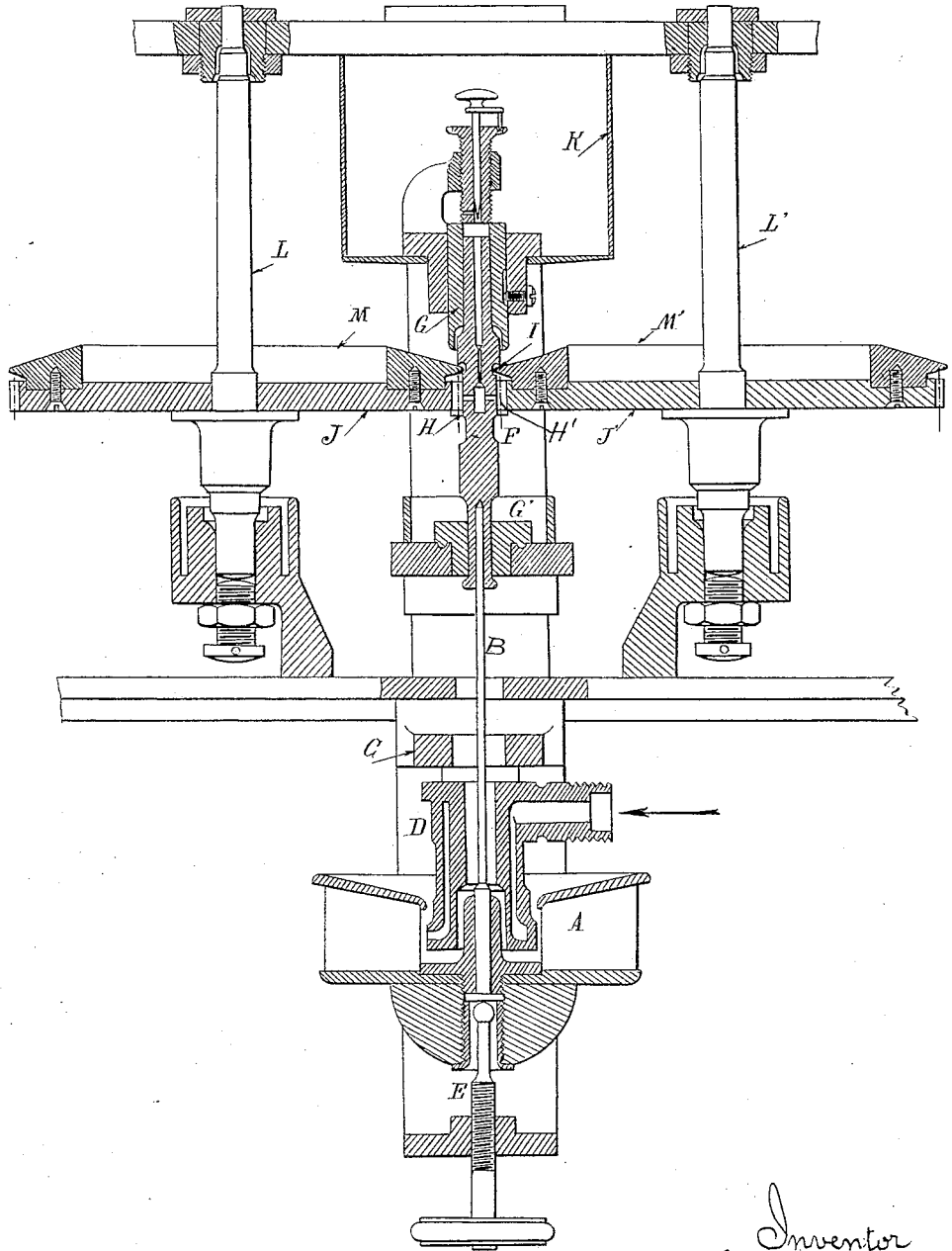
Witnesses
H. van Oldenneel
E. A. Scott
Inventor
H Hyacinthe Trenta
by Richardson
Attorneys
THE NORRIS PETERS CO., PHOTO-LITHO., WASHINGTON, D. C.

UNITED STATES PATENT OFFICE.

HYACINTHE TRENTA, OF LYONS, FRANCE.

TURBINE.

SPECIFICATION forming part of Letters Patent No. 572,667, dated December 8, 1896.

Application filed July 25, 1896. Serial No. 600,544. (No model.) Patented in France June 12, 1896, No. 254,717.

*To all whom it may concern:*

Be it known that I, HYACINTHE TRENTA, a citizen of the Republic of France, residing at Lyons, France, have made certain new and useful Improvements in Turbines, of which the following is a specification.

The invention has been patented in France, No. 254,717, dated June 12, 1896.

My invention relates to turbine wheels going at a high speed and revolving on a vertical axis. The object is to enable these wheels to answer to the effects of centripetal force, which tend to make their axis of rotation coincide with their center of gravity. These conditions are indispensable to avoid the shocks and vibrations. This result is obtained, first, by the suspension of the wheel at the lower extremity, entirely free, of a light and sufficiently flexible shaft; second, and by this peculiar mode of suspension doing away with friction and sliding.

The annexed drawing shows the arrangement adopted to obtain the suspension.

A represents a vertical section of the *ensemble* of a turbine with lateral discharge, but this system of suspension can be applied to any other kind of turbine.

The paddle-wheel A is fixed to the lower extremity of a light steel shaft B. The distributer D, held by a fixed cross-bar C, leaves around the shaft B and inside the paddles enough play for the small displacements of the wheel. Moreover, these displacements are limited, in case of an accidental pressure, by a fixed pin E, occupying the center of a socket E', belonging to the wheel.

The shaft B, which at its lower extremity is entirely free and slightly flexible, continues in a more rigid part F, which turns very freely in two bearings of the shaft G G' and carries between the two a pinion H, which serves to transmit the movement, and above a rim in the shape of a bell I, destined for the suspension of the wheel. The pinion H is formed by simply making teeth about the shaft, and these are shown in the drawing at H. The pinion H meshes with two wheels J J', placed symmetrically with the pinion and borne by two vertical shafts L L', which turn on pivots. Above the wheels J J' two fellies M M' are fixed, the upper sides of which are inclined and form two conic surfaces. The weight of the turbine wheel and its shaft is thus carried by the two fellies M M', each of which has only a mathematical point of contact with the edge of the bell-shaped rim I. These two contact-points being situated on circles of revolution of the pinion H and of the two wheels J J' will displace themselves without any sliding by the sole effect of the movement of rotation of the surfaces in contact, and these surfaces will be of tempered steel or some other hard substance. There will be little wear or resistance.

The oiling of the different organs of suspension and transmission is done by means of a tank K, placed over the shaft F and from which the oil runs into the bearing of the shaft G through an orifice, the flow of which can be regulated, and from there the oil flows along the bell-shaped rim I and then on the fellies. The shaft F itself being hollow receives a part of this oil and distributes it through lateral orifices in the pinion H against cogs of the wheels J J', and the excess of oil descends along the shaft F and greases in its turn the bearing G.

When the steam or fluid motor is introduced in the distributer D, the turbine wheel oscillates for a few moments and then takes its position of equilibrium, in which it continues to revolve without vibrations whatever the speed may be. The power which is developed is taken from one of the shafts L L', or in preference from both together, by coupling them with straps, endless ropes, or gearings.

What I claim is—

1. In combination, a turbine wheel, a vertically-extending flexible shaft, carrying the said wheel at its lower end said shaft being free at its lower end to move laterally with the wheel and a rotary bearing held against lateral vibrations at the upper end of the shaft whereby the lateral oscillations will occur exclusively in the flexible portion of the shaft, substantially as described.

2. In combination, the turbine wheel having a socket in its lower portion, the flexible shaft, means for suspending the shaft at its upper end, the said wheel being fixed to the lower end and means for centering and limiting the movement of the lower end of the shaft with the turbine consisting of a fixed pin extending into the socket of the wheel, substantially as described.

3. In combination, the turbine wheel, the shaft having the bell-shaped rim I, the two fellies M, M' engaging the rim for suspending the shaft and rotary carrying means for supporting the fellies, substantially as described.

4. In combination, the shaft, the pinion thereon, the gear-wheels J, J', meshing with the pinion and provided with fellies M M' engaging an overhanging rim on the shaft and the turbine wheel at the lower end of the shaft, substantially as described.

In witness whereof I have hereunto set my hand in presence of two witnesses.

HYACINTHE TRENTA.

Witnesses:
 MARIUS VACHOR,
 GASTON JEAUMAUR.